United States Patent
Navon et al.

(10) Patent No.: US 11,159,440 B2
(45) Date of Patent: Oct. 26, 2021

(54) HYBRID PACKET MEMORY FOR BUFFERING PACKETS IN NETWORK DEVICES

(71) Applicant: Marvell Israel (M.I.S.L) Ltd., Yokneam (IL)

(72) Inventors: Gideon Navon, Tel-Aviv (IL); Zvi Shmilovici Leib, Tel-Aviv (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 16/197,028

(22) Filed: Nov. 20, 2018

(65) Prior Publication Data

US 2019/0158414 A1    May 23, 2019

Related U.S. Application Data

(60) Provisional application No. 62/590,039, filed on Nov. 22, 2017.

(51) Int. Cl.
*H04L 12/54* (2013.01)
*H04L 12/873* (2013.01)
(Continued)

(52) U.S. Cl.
CPC ........ *H04L 47/522* (2013.01); *H04L 47/2441* (2013.01); *H04L 47/52* (2013.01);
(Continued)

(58) Field of Classification Search
CPC ... H04L 47/522; H04L 47/52; H04L 47/6215; H04L 49/9021; H04L 47/56; H04L 47/2441; H04L 47/6275
See application file for complete search history.

(56) References Cited

U.S. PATENT DOCUMENTS 9,063,841 B1    6/2015  Valency et al.
9,294,410 B2    3/2016  Boden
(Continued)

OTHER PUBLICATIONS

U.S. Appl. No. 15/423,389, Kampeas et al., "Distributed Dynamic Load Balancing in Network Systems," filed Feb. 2, 2017.
(Continued)

*Primary Examiner* — Edan Orgad
*Assistant Examiner* — Malick A Sohrab

(57) ABSTRACT

A network device processes received packets at least to determine port or ports of the network device via which to transmit the packet. The network device also classifies the packets into packet flows, the packet flows being further categorized into traffic pattern categories characteristic of traffic pattern characteristics of the packet flows. The network device buffers, according to the traffic pattern categories of the packet flows, packets that belong to the packet flows in a first packet memory or in a second packet memory, the first packet memory having a memory access bandwidth different from a memory access bandwidth of the second packet memory. After processing the packets, the network device retrieves the packets from the first packet memory or the second packet memory in which the packets are buffered, and forwards the packets to the determined one or more ports for transmission of the packets.

20 Claims, 3 Drawing Sheets

(51) Int. Cl.
*H04L 12/865* (2013.01)
*H04L 12/851* (2013.01)
*H04L 12/875* (2013.01)
*H04L 12/883* (2013.01)
*H04L 12/863* (2013.01)

(52) U.S. Cl.
CPC .......... *H04L 47/56* (2013.01); *H04L 47/6215* (2013.01); *H04L 47/6275* (2013.01); *H04L 49/9021* (2013.01)

(56) References Cited

U.S. PATENT DOCUMENTS

| | | | | |
|---|---|---|---|---|
| 2002/0181484 | A1* | 12/2002 | Aimoto | H04L 47/525 370/413 |
| 2004/0179542 | A1* | 9/2004 | Murakami | H04L 45/00 370/413 |
| 2005/0105532 | A1* | 5/2005 | Yun | H04L 47/10 370/395.21 |
| 2008/0192742 | A1* | 8/2008 | Kobayashi | H04L 47/2416 370/389 |
| 2011/0228674 | A1* | 9/2011 | Pais | H04L 49/90 370/235 |
| 2014/0269298 | A1* | 9/2014 | Lu | H04L 49/505 370/235 |
| 2015/0163144 | A1* | 6/2015 | Koponen | H04L 47/11 370/237 |
| 2018/0131620 | A1* | 5/2018 | Su | H04L 47/2441 |

OTHER PUBLICATIONS

"Speeding Applications in Data Center Networks—The Interaction of Buffer Size and TCP Protocol Handling and its Impact on Data-Mining and Large Enterprise IT Traffic Flows," Miercom/CISCO report retrieved from https://miercom.com/pdf/reports/20160210.pdf; 22 pages (Feb. 2016).

Cheng et al., "Isolating Mice and Elephant in Data Centers," retrieved from arXiv:1605.07732 <https://arxiv.org/abs/1605.07732>, 14 pages (Jun. 1, 2016).

International Search Report and Written Opinion in Intenrational Patent Application No. PCT/IB2018/059174, dated Jan. 24, 2019 (12 pages).

\* cited by examiner ional Patent App. No. 62/590,039, entitled "Hybrid Packet Buffer Architecture for Data-Center Networks," filed on Nov. 22, 2017, the disclosure of which is hereby expressly incorporated herein by reference in its entirety.

FIELD OF TECHNOLOGY

The present disclosure relates generally to communication networks, and more particularly to buffering packets in a network device.

BACKGROUND

Network devices such as network switches, routers, edge devices and the like often utilize packet memories to buffer packets while the packets are being processed by the network device and/or are awaiting transmission during times of congestion experienced by output ports of the network device. Typically, a network device utilizes either an internal packet memory (e.g., a packet memory implemented on a same chip as a packet processor of the network device) or external packet memory (e.g., a packet memory implemented as a separate device external to a packet processor chip of the network device). Internal packet memories are typically smaller than external packet memories, but internal packet memories typically have higher access bandwidths than external packet memories. External packet memories, on the other hand, are typically larger and provide more storage capacity than internal packet memories, but external packet memories typically have lower access bandwidths than internal packet memories.

SUMMARY

In an embodiment, a method for processing packets in a network device includes: receiving, at a packet processor of the network device, packets ingressing via a network port among a plurality of network ports of the network device; processing, with the packet processor, the packets at least to determine one or more network ports, of the plurality of network ports, via which the packets are to be transmitted from the network device; classifying, with the packet processor, the packets into packet flows, the packet flows being further categorized into traffic pattern categories characteristic of traffic pattern characteristics of the packet flows; buffering, with the packet processor, according to the traffic pattern categories of the packet flows, packets that belong to the packet flows in one of i) a first packet memory and ii) a second packet memory, the first packet memory having a first memory access bandwidth different from a second memory access bandwidth of the second packet memory; after processing the packets, retrieving, with the packet processor, the packets from the first packet memory or the second packet memory in which the packets are buffered; and forwarding, with the packet processor, the packets to the determined one or more network ports for transmission of the packets via the determined one or more network ports.

In another embodiment, a network device comprises a plurality of network ports configured to couple to a plurality of network links and a packet processor coupled to the plurality of network ports. The packet processor is configured to: process packets received via a network port among the plurality of network ports at least to determine one or more other network ports among the plurality of network ports via which the packets are to be transmitted from the network device; classify the packets into packet flows, the packet flows being further categorized into traffic pattern categories characteristic of traffic pattern characteristics of the packet flows; buffer, according to the traffic pattern categories of the packet flows, packets that belong to the packet flows in one of i) a first packet memory an ii) a second packet memory, the first packet memory having a first memory access bandwidth different from a second memory access bandwidth of the second packet memory; after processing the packets, retrieve the packets from the first packet memory or the second packet memory in which the packets are buffered; and forward the packets to the determined one or more network ports for transmission of the packets via the determined one or more network ports.

DETAILED DESCRIPTION

Figure 1:
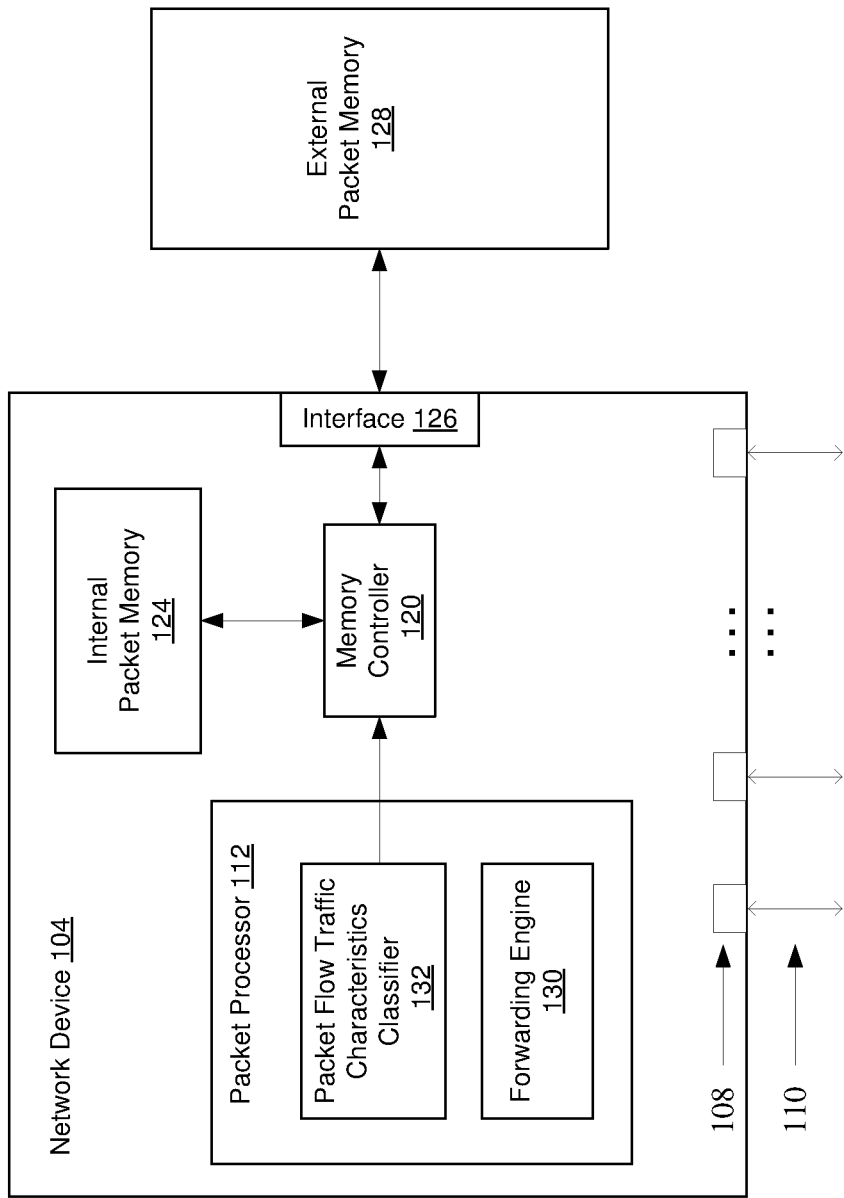
FIG. 1 is a block diagram of an example network device configured to utilize hybrid packet memory architecture for buffering packets that traverse the network device, according to an embodiment.

In embodiments described below, a network device is configured to utilize a hybrid packet memory architecture that includes a first packet memory and a second packet memory for buffering packets received at the network device until the packets can be transmitted by the network device, for example during times of congestion experienced by output ports of the network device. In an embodiment, the first packet memory has an access bandwidth that is relatively higher as compared to an access bandwidth of the second packet memory. On the other hand, the first packet memory is relatively smaller in size and lower in storage capacity as compared to the second packet memory, in an embodiment. In an embodiment, to reduce memory access bandwidth when using the second (lower access bandwidth) packet memory, the network device is configured to offload to the second packet memory buffering of only some packets received by the network device, while buffering other packets in the first (higher access bandwidth) packet memory, without offloading buffering of the other packets to the second packet memory. In an embodiment, the network device determines which packets to offload to the second, lower access bandwidth, packet memory based on traffic patterns of various packet flows being handled by the network device. In other words, the network device considers a traffic pattern that is characteristic of a packet flow to which a received packet belongs to determine whether to offload buffering of the received packet to the second (lower access bandwidth) packet memory or to buffer the received packet in the first (higher access bandwidth) packet memory, in an embodiment.

In an example embodiment, packet flows handled by the network device are categorized into different categories according to traffic patterns of the packet flows, including at least a first traffic pattern category generally corresponding to relatively larger (e.g., in total expected volume of data, in duration of time, in occupied bandwidth, etc.) packet flows and a second traffic pattern category generally corresponding to relatively smaller (e.g., in total expected volume of data, in duration of time, in occupied bandwidth, etc.) packet flows. By way of example, the first traffic pattern category corresponds to persistent, long-lived and high bandwidth "elephant" packet flows (e.g., large file transfers) of a datacenter network, whereas the second traffic pattern category corresponds to small, short-lived and low bandwidth "mice" packet flows (e.g., query responses) of the datacenter network, in an embodiment. As another example, the second traffic pattern category corresponds to long-lived and low bandwidth backhaul traffic of a mobile network e.g., traffic transmitted on a link to a core network in the mobile network), whereas the first traffic pattern category corresponds to other traffic, such as short-lived and high bandwidth fronthaul traffic of the mobile network (e.g., traffic transmitted on a link in an edge of the mobile network), in another embodiment. In other embodiments, the first traffic pattern category and/or the second traffic pattern category correspond to packet flows having other suitable traffic pattern characteristics.

The network device is configured to offload buffering of packets that belong to the relatively smaller packet flows to the second (lower access bandwidth) packet memory and to buffer packets that belong to the relatively larger packet flows in the first (higher access bandwidth) packet memory, in an embodiment. Generally, in at least some embodiments, relatively smaller packet flows are more sensitive to added latency that may result from packet drops/retransmissions and the resulting transmission rate adjustments caused by flow control mechanisms (e.g., transmission control protocol (TCP) flow control mechanisms), because such added latency is generally a larger percentage of a total time in which the packet flow would otherwise complete without packet drops and retransmissions as compared to a percentage of a total time in which a relatively larger packet flow would complete without packet drops and retransmissions. In an embodiment, by offloading buffering packets that belong to the relatively smaller packet flows to the lower access bandwidth packet memory, the network device avoids packet drops and retransmissions in the relatively smaller packet flows due to the higher storage capacity of the lower access bandwidth packet memory. Moreover, in at least some network environments, relatively smaller packet flows generally constitute a relatively small percentage of the total traffic bandwidth being handled by the network device. Accordingly, offloading only the relatively smaller packet flows to the lower access bandwidth packet memory reduces the bandwidth that needs to be supported by the lower access bandwidth packet memory, in at least some embodiments. Further, reducing the bandwidth that needs to be supported by the lower access bandwidth packet memory, in turn, facilitates reduction in the size of interface required to interface with the lower access bandwidth packet memory, in at least some embodiments.

FIG. 1 is a block diagram of an example network device 104 that is configured to utilize a hybrid packet memory architecture for buffering packets received by network device 104, for example during times of congestion, according to an embodiment. The network device 104 includes a plurality of network ports 108 configured to couple to respective network links 110. The network device 104 also includes a packet processor 112 coupled to the network ports 108. The packet processor 112 is configured to process packets received via the network ports 108, and to determine one or more other network ports 108 via which packets are to be forwarded to one or more external devices. In an example embodiment, the network device 104 is part of a data center switching system. As merely an example, the network device 104 is a leaf switch in a data center network. In other embodiments, the network device 104 is a suitable network device other than a leaf switch in a data center network or a network device utilized in a suitable network (e.g., a mobile network) other than a data center network.

The packet processor 112 is coupled to a memory controller 120, in an embodiment. In another embodiment, the packet processor 112 includes the memory controller 120. The memory controller 120 is coupled to a first packet memory 124. Additionally, the memory controller 120 is coupled to a memory interface 126 configured to interface with a second packet memory 128. In an embodiment, the first packet memory is implemented on a same chip as the packet processor 112 of the network device 104. On the other hand, the second packet memory 128 is not implemented on the same chip as the packet processor 112, in an embodiment. For example, the second packet memory 128 is implemented as a separate device external to the network device 104, or is included in a separate device external to the network device 104, in an embodiment. In another embodiment, the second packet memory 128 is implemented on a different chip from the packet processor 112, but the second packet memory 128 is nonetheless internal to the network device 104 (e.g., packaged together with other components of the network device 104). By way of example, the first packet memory 124 is sometimes referred to herein as "internal packet memory" and the second packet memory 128 is sometimes referred to herein as "external packet memory." However, the first packet memory 124 and the second packet memory 128 are both either internal packet memories or are both external packet memories, in some embodiments.

In an embodiment, the internal packet memory 124 is implemented using static random access memory (SRAM) technology. The external packet memory is implemented using dynamic random access memory (DRAM) technology, in an embodiment. In an embodiment, the external packet memory is a double data rate (DDR) type memory, and the memory interface 126 configured to interface with the external packet memory 128 is a DDR memory interface. In other embodiments, the internal packet memory 124, the external packet memory 128 and/or the memory interface 126 are implemented using other suitable technologies. As merely an example, the external packet memory is implemented as a graphics double data rate (GDDR) memory, a flash memory, or any other suitable type of memory, in various embodiments.

In various embodiments, the internal packet memory 124 has different access bandwidth, cost, size, storage capacity and other characteristics as compared to the external packet memory 128. For example, the internal packet memory 124 has a higher access bandwidth and is capable of operating at full wire speed supported by the network device 104. Conversely, in some embodiments, the external packet memory 128 has a lower access bandwidth and is not capable of operating at full wire speed supported by the network device 104, in an embodiment. However, the internal packet memory 124 is more costly than the external packet memory 128, in at least some embodiments. Moreover, the internal packet memory 124 occupies on-chip space that is suitable for adding additional processing circuitry, for example, in an embodiment. Thus, due for example to cost and size constraints, the internal packet memory 124 is generally smaller in size and lower in storage capacity than the external packet memory 128, in some embodiments. As merely an example, the internal packet memory 124 has a storage capacity on the order of megabytes (MB) or less, while the external packet memory 128 has a storage capacity on the order of gigabytes (GB) or more, in an embodiment. The higher-capacity external packet memory 128 provides is capable of buffering more packets at a given time as compared to the lower-capacity internal packet memory 124, in some embodiments. For example, the external packet memory 128 is capable of buffering 100 milliseconds (ms) or more worth of traffic that traverses the network device 104, while the internal packet memory 124 is capable of buffering 50 microseconds (µs) or less worth of traffic that traverses the network device 104, in an embodiment.

In an embodiment, the network device 104 is configured to distribute buffering of packets belonging to packet flows being processed by the network device 104 among the internal packet memory 124 and the external packet memory 128 based on traffic pattern characteristics exhibited by the packet flows. For example, the network device 104 is configured to buffer packets that belong to packet flows that exhibit first traffic pattern characteristics in the internal packet memory 124 and to buffer packets that belong to other packet flows exhibiting second traffic pattern characteristics to the external packet memory 128. As an example, the network device 104 is configured to select the internal packet memory 124 for buffering of packets that belong to packet flows exhibiting traffic patterns characteristic of relatively larger packet flows (e.g., elephant packet flows in a datacenter network, fronthaul packet flows in a mobile network, etc.), such as packet flows with a measured or anticipated relatively high total volume of packets that belong to the packet flows, measured or anticipated relatively high rate at which the packets that belong to the packet flows are received by the network device, measured or anticipated relatively larger percentage of the total traffic bandwidth occupied by the packet flows relative to the total bandwidth handled by the network device, etc., in an embodiment. On the other hand, the network device 104 is configured to select the external packet memory 128 for buffering of packets that belong to packet flows exhibiting traffic patterns characteristic of relatively smaller packet flows (e.g., mice packet flows, backhaul mobile network packet flows, etc.), such as packet flows with a measured or anticipated relatively low total volume of packets that belong to the packet flows, measured or anticipated low rate at which the packets that belong to the packet flows are received by the network device, measured or anticipated relatively smaller percentage of traffic bandwidth occupied by the packet flows relative to the total traffic bandwidth handled by the network device, etc., in an embodiment. Offloading packets in only some, but not all, packet flows to the external packet memory 128 limits the access bandwidth requirements of the external packet memory 128 and also facilitates implementing a smaller memory interface 126 required to interface with the external packet memory 128, in at least some embodiments. For example, an interface with a smaller number of connections (e.g., pins) may be implemented as compared to external memory interfaces in systems in which a greater portion of total bandwidth (e.g., the entirety of the total bandwidth) handled by a network device is supported by an external packet memory utilized by the network device. At the same time, because packets that belong to some packet flows are buffered in the external packet memory 128, memory in the internal packet memory 124 is also freed up to be used for buffering packets in other packet flows, in an embodiment.

In operation, packets received by the network device 104 are provided to the packet processor 112 for processing of the packets. In some embodiments, during at least initial stages of processing of a packet, at least a received portion of the packet is temporarily stored in one or more input buffers (not shown) until the packet processor 112 selects the internal packet memory 124 or the external packet memory 128 for buffering of the received packet. The one or more input buffers are implemented in the internal packet memory 124 (e.g., in a dedicated portion of internal packet memory 124), for example, or are implemented in one or memories separate from the internal packet memory 124, in various embodiments. In some embodiments, a data unit corresponding to a packet, such as a packet descriptor corresponding to the packet is generated, and the packet descriptor rather than the packet itself is provided to the packet processor 112 for processing of the packet. The packet descriptor includes header information and other information associated with the packet, in an embodiment. The packet processor 112 is configured to update information in the packet descriptor, as needed, during processing of the packet descriptor.

The packet processor 112 includes a forwarding engine 130 and a packet flow traffic characteristics classifier 132, in an embodiment. The forwarding engine 130 is configured to analyze header information in packets to determine network ports 108 via which the packets are to be transmitted. As merely an illustrative example, the forwarding engine 130 is configured to use a destination address in a header of a packet to perform a lookup in a forwarding database (not shown), which stores correspondences between destination addresses and network ports 108, to determine a particular network port 108 via which the packet is to be transmitted. As another illustrative example, the forwarding engine 130 is configured to use a VLAN ID in a header of a packet to perform a lookup in a forwarding database (not shown), which stores correspondences between VLAN IDs and network ports 108, to determine a particular set of network ports 108 for the packet. The forwarding engine 130 is configured to store an ID of a network port (or set of multiple network ports) in a packet descriptor corresponding to the packet, according to an embodiment.

The packet flow traffic characteristics classifier 132 is configured to classify packets into packet flows, in an embodiment. In an embodiment, the packet flow traffic characteristics classifier 132 is configured to classify the packets into packet flows by analyzing information in headers of the packets and/or information otherwise associated with the packets. Generally, a packet flow corresponds to a stream of packets that share certain shared characteristics. For example, at a basic level a particular packet flow may be defined as a stream of packets all of which have a same particular source address and a same particular destination address, in an embodiment. In various embodiments, a packet flow may also be defined as a stream of packets with headers all of which have particular common attributes such as one or more of i) a particular source address, ii) a particular destination address, iii) a particular port on which the packet is received, iv) a particular port via which the packet is to be transmitted, v) a particular virtual local area network (VLAN) identifier (ID), vi) a particular priority, vii) a particular packet type, viii) a particular quality of service requirement, etc. As merely an example, a packet flow may be defined as a stream of packets with headers all of which have same 5-tuple set of values, including i) a source IP address, ii) a source port number, iii) a destination IP address, iv) a destination port number and v) a particular IP protocol. The packet flow traffic characteristics classifier 132 is configured to assign respective flow IDs to at least some packets, where the flow IDs indicate the respective flows to which packets belong, according to an embodiment. The packet flow traffic characteristics classifier 132 is configured to store the flow ID assigned to a packet in a packet descriptor corresponding to the packet, according to an embodiment.

The packet flow traffic characteristics classifier 132 is further configured to classify the packet flows according to traffic pattern characteristics corresponding to the packet flows, in an embodiment. For example, the packet flow traffic characteristics classifier 132 is configured to classify a particular packet flow as a packet flow of a first traffic pattern category or of a second traffic pattern category, in an embodiment. In an embodiment, the first traffic pattern category corresponds to relatively larger, higher bandwidth, packet flows (e.g., elephant packet flows in a datacenter network, fronthaul packet flows in a mobile network, etc.), and the second traffic pattern category corresponds to relatively smaller, lower bandwidth, packet flows (e.g., mice packet flows in a datacenter network, backhaul packet flows in a mobile network, etc.). In general, packet flows of the first traffic pattern category are larger than packet flows of the second traffic pattern category, in an embodiment. For example, a packet flow of the first traffic pattern category generally carries a relatively larger total volume of data (e.g., number of bytes, number of packets, etc.) as compared to a total volume of data carried in a packet flow of the second traffic pattern category, in an embodiment. As merely an example, a packet flow in the first traffic pattern category may correspond to a large file transfer that is transmitted in twenty or more packets. On the other hand, a packet flow in the second traffic pattern category may be a packet flow transmitted in response to a query, and the packet flow may be transmitted in one or two packets, or the packet flow may correspond to an email message that may be transmitted in three or four packets, in an embodiment. Thus, for example, a packet flow of the first traffic pattern category generally includes a number of packets or a number of bytes that exceeds (or is greater than or equal to) a predetermined threshold. On the other hand, a packet flow of the second traffic pattern category includes a number of packets or a number of bytes that does not exceed (or is less than or equal to) a predetermined threshold, in an embodiment. In some embodiments, packets that belong to packet flows in the second traffic pattern category are generally smaller in size as compared to packets that belong to packet flows in the second traffic pattern category. In other embodiments, packets that belong to packet flows in the second traffic pattern category are the same as or similar to in size as compared to packets that belong to packet flows in the first traffic pattern category.

In some embodiments, packet flows of the second traffic pattern category are bursty and short-lived, while packet flows of the first traffic pattern category are more uniform and persistent. By way of example, short-lived mice packet flows in a datacenter network are typically bursty, for example due to mice packet flows (e.g., query responses) that are concurrently received on multiple ports 108 and that are to be transmitted via a same port 108 (e.g., to a host device that transmitted the query), in an embodiment. On the other hand, elephant packet flows in the datacenter network are typically more uniform and persistent, in an embodiment. In other embodiments, uniformity of packet flows of the second traffic pattern category is the same as or similar to the uniformity of packet flows of the first traffic pattern category In some embodiments, packet flows of the second traffic pattern category typically experience relatively higher levels of congestion, while packet flows of the first traffic pattern category typically experience relatively lower levels of congestion. By way of example, backhaul packet flows in a mobile network typically experience high levels of congestion, for example because of mismatch in bandwidth between a downlink port 108 via which a backhaul packet flow is received and an uplink port 108 to which the packet flow is directed. On the other hand, fronthaul packet flows in the mobile network typically experience low levels of congestion, in an embodiment. In other embodiments, congestion levels of packet flows of the second traffic pattern category are the same as or similar to the congestion levels of packet flows of the first traffic pattern category.

In various embodiments, offloading buffering of bursty and/or typically congested, but relatively lower bandwidth, packet flows to the lower access bandwidth external packet memory 128 facilitates absorption of the packet flows due to the higher storage capacity of the external packet memory 128. Moreover, offloading buffering of bursty and/or typically congested, but relatively lower bandwidth, packet flows to the external packet memory 128 frees up memory space for relatively higher bandwidth packet flows in the higher access bandwidth internal packet memory 128, in an embodiment. By way of example, in an embodiment, due to the higher storage capacity of the external packet memory 128, offloading buffering of packets that belong to short-lived bursty packet flows, such as mice packet flows in a datacenter network, to the external packet memory 128 facilitates absorption of the bursty packet flows, for example during spikes in traffic caused by bursts of packets received in the bursty packet flows. Moreover, in at least some embodiments, the higher storage capacity of the external packet memory 128 allows the short-lived packet flows to be buffered without packet drops, thereby eliminating packet retransmissions that would significantly increase (e.g., double) the total completion time of a short-lived packet flow. On the other hand, long-lived persistent packet flows can better tolerate packet drops and retransmissions because added latency resulting from packet drops and retransmissions is generally a relatively small percentage of a total time in which the packet flow would otherwise complete without packet drops and retransmissions. Accordingly, packet drops and retransmissions that may result from buffering packets that belong to the long-lived persistent packet flows in the lower storage capacity internal packet memory 124 does not significantly affect completion time of the long-lived persistent packet flows, in at least some embodiments. Moreover, offloading buffering of the short-lived packet flows to the external packet memory 128 frees up memory space for the long-lived, persistent packet flows in the higher memory access bandwidth internal packet memory 124, in an embodiment.

As another example, in an embodiment, offloading buffering of packets that belong to typically more congested packet flows, such as backhaul packet flows in a mobile network, to the larger storage capacity external packet memory 128 facilitates absorption of the congested packet flows in the external packet memory 128, in an embodiment. Moreover, offloading buffering of the typically congested packet flows to the external packet memory 128 frees up memory space for the lower congestion but higher bandwidth packet flows, such as fronthaul packet flows in the mobile network, in the higher memory access bandwidth internal packet memory 124, in an embodiment.

The packet flow traffic characteristics classifier 132 is configured to determine, based on a traffic pattern category of a particular flow, whether to buffer packets that belong to particular packet flows in the internal packet memory 124 or in the external packet memory 128, in an embodiment. The packet flow traffic characteristics classifier 132 is configured to provide, to the memory controller 120, an indication of the packet memory in which to buffer packets that belong to the particular packet flows, in this embodiment. In another embodiment, the packet flow traffic characteristics classifier 132 is configured to indicate, to the memory controller 120, the determined packet flow traffic characteristics of the packet flows and/or the determined traffic pattern categories of the packet flows; and the memory controller 120 is configured to determine whether to buffer a packet that belongs to a particular packet flow in the internal packet memory 124 or the external packet memory 128 based on the packet flow traffic characteristics and/or traffic pattern categories.

In various embodiments, the packet flow traffic characteristics classifier 132 is configured to statistically determine traffic pattern characteristics of packet flows, and to assign traffic pattern categories to the packet flows based on the statistically determined traffic pattern characteristics of the packet flows. As an example, in an embodiment, the packet flow traffic characteristics classifier 132 is configured to determine a traffic pattern category of a particular packet flow based on sampling several packets received in the particular packet flow during a sampling period. For example, in an embodiment, the packet flow traffic characteristics classifier 132 is configured to determine whether a particular packet flow is of a first traffic pattern category or a second traffic pattern category by sampling one or both of i) a volume of data (e.g., number of bytes, number of packets, etc.) expected to be received in the particular packet flow during a sampling period and ii) a rate at which data (e.g., bytes per second, packets per second, etc.) in the particular packet flow is received during the sampling period, such as during a sampling period that imitates when a first packet that belongs to the packet flow is received. If the sampled volume of data in the particular packet exceeds (or is greater than or equal to) a predetermined threshold, then the packet flow traffic characteristics classifier 132 determines that the particular packet flow is of a first category corresponding to relatively larger packet flows, in an embodiment. Similarly, if the sampled rate of data in a particular packet flow exceeds (or is greater than or equal to) a predetermined threshold, then the packet flow traffic characteristics classifier 132 determines that the particular packet flow is of the first category corresponding to relatively larger packet flows, in an embodiment. On the other hand, if the sampled volume and/or rate of data in a particular packet flow does not exceed a predetermined threshold, then the packet flow type classifier 134 determines that the particular packet flow is of a second traffic pattern category corresponding to relatively smaller packet flows, in an embodiment.

Additionally or alternatively, in some embodiments, the packet flow traffic characteristics classifier 132 is configured to deterministically determine traffic pattern categories of particular packet flows based on information included in or otherwise associated with packets that belongs to the particular packet flow. For example, the packet flow traffic characteristics classifier 132 is preconfigured to determine a traffic pattern category of a particular packet flow based on header information in a packet that belongs to the packet flow and/or information otherwise associated with the packet that belongs to the packet flow. As merely an example, in an embodiment, the packet flow traffic characteristics classifier 132 is configured to determine a traffic pattern category of a packet flow based on one or more of i) a source address, ii) a destination address, iii) a port at which the packet was received, iv) a port via which the packet is to be transmitted v) a data priority indication (e.g., a quality of service (QoS)) indication, vi) data type indication, vii) data application indication, viii) a VLAN ID, etc. In other embodiments, the packet flow traffic characteristics classifier 132 is configured to determine a traffic pattern category of a packet flow based on other suitable information indicative of traffic pattern characteristics of the packet flow.

In some embodiments, the packet flow traffic characteristics classifier 132 includes, or is coupled to, a ternary content addressable memory (TCAM) (not shown), or another suitable storage device, that stores correspondences between i) particular packet header information and/or other information associated with packets and ii) flow IDs; and the packet flow traffic characteristics classifier 132 is configured to use packet header information and/or other information associated with a packet to perform one or more lookups in the TCAM (or other suitable storage device) to determine a particular flow ID to be assigned to the packet. In some embodiments, an entry in the TCAM corresponding to a particular packet flow further stores an indication of a traffic pattern category of the packet flow and/or a packet memory in which to buffer packets that belong to the packet flow; and the packet flow traffic characteristics classifier 132 is configured to perform a lookup in the TCAM (or other suitable storage device) to jointly determine a particular flow ID associated with a packet flow to which a packet belongs and one or both of i) a traffic pattern category of the packet flow and ii) a packet memory in which to buffer the packet. In another embodiment, a separate TCAM memory is used for packet flow categorization. For example, although the packet processor 112 is illustrated in FIG. 1 as having a packet flow traffic characteristics classifier 132 that performs both packet flow classification and traffic pattern categorization, the packet processor 112 in some embodiments includes i) a flow classifier (e.g., coupled to a first TCAM) that determines to a particular packet flow to which a packet belongs assigns a flow ID to the packet and ii) a flow categorizer (e.g., coupled to a second TCAM) that determines, based at least in part on the flow ID assigned to the packet, a traffic pattern category of the particular packet flow to which the packet belongs and/or a packet memory in which to buffer the packet.

In an embodiment, when determining a packet memory in which to store a packet that belongs to a packet flow, the packet flow traffic characteristics classifier 132 is configured to also consider a current congestion level a queue corresponding to a port 108 via which the packet flow is to be transmitted from the network device. In an embodiment, the current queue congestion level information is used to override selection of the external packet memory 128 for buffering packets of a particular packet flow even if the particular packet flow is determined be of a traffic pattern category that indicates that the external packet memory 128 is to be used for buffering packets that belong to the packet flow. For example, the packet flow traffic characteristics classifier 132 is configured to select the internal packet memory 124 to buffer a packet that belongs to a particular packet flow when the current fill level of the queue corresponding to a port 108 via which the particular packet flow is to be transmitted is below (or is not greater than) a predetermined threshold, even if the particular packet flow is of a traffic pattern category that would otherwise indicate the external packet memory 128 for buffering of the packet, in an embodiment. In some embodiments, the packet flow traffic characteristics classifier 132 is configured to consider other information for determining a packet memory in which to buffer packets of a particular packet flow, such as predictive traffic pattern and/or queue fullness information provided to the packet flow traffic characteristics classifier 132 from an artificial intelligence (AI) engine, for example.

In an embodiment, prior to determining a traffic pattern category of a packet flow, packets that belong to the packet flow are buffered in a default packet memory (e.g., the internal packet memory 124 or the external packet memory 128). By way of example, the external packet memory 128 is described herein as being the default packet memory. Thus, for example, the packet flow traffic characteristics classifier 132 is configured to select the external packet memory 128 for first several packets of a packet flow, before a sufficient number of packets is received in the packet flow to determine the traffic pattern characteristics of the packet flow. Once the packet flow is determined to be of the first traffic pattern category that corresponds to relatively larger packet flows, subsequently received packets that belong to the packet flow are buffered in the internal packet memory 124, in an embodiment. For example, if the volume of data volume and/or rate of data for the particular packet flow exceeds a predetermined threshold, then the packet flow traffic characteristics classifier 132 determines that the particular packet flow is of the first traffic pattern category that corresponds to the relatively larger packet flows, and begins buffering subsequent packets in the particular packet flow in the internal packet memory 124, in an embodiment. For example, the packet flow traffic characteristics classifier 132 updates a TCAM entry corresponding to the particular packet flow to indicate that the particular packet flow is of the first traffic pattern category and/or to directly indicate that the internal packet memory 124 is to be used for buffering packets in the packet flow, causing the internal packet memory 124 to be subsequently selected for buffering packets that belong to the particular packet flow, in an embodiment.

The memory controller 120 is configured to store a packet in the determined one of the internal packet memory 124 or the external packet memory 128 for buffering of the packet. In some embodiments, the memory controller 120 is configured to include in a packet descriptor associated with the packet an indication of a memory location in the one of the internal packet memory 124 or the external packet memory 128 in which the packet is buffered. After processing of the packet is completed by the packet processor 112 and when the packet is scheduled for transmission via a port 108 determined for the packet, the packet is retrieved from the memory location in the one of the internal packet memory 124 and the external packet memory 128 in which the packet is buffered. For example, the memory controller 120 or another suitable unit retrieves the packet from the memory location in the one of the internal packet memory 124 and the external packet memory 128 in which the packet is buffered. The retrieved packet is then forwarded to the port 108 for transmission of the packet. In an embodiment, retrieving the packet includes determining whether the packet is buffered in the internal packet memory 124 or the external packet memory 128. For example, the memory controller 120 or other suitable unit determines, based on flow ID associated with the packet, whether the packet is buffered in the internal packet memory 124 or the external packet memory 128.

Figure 2:
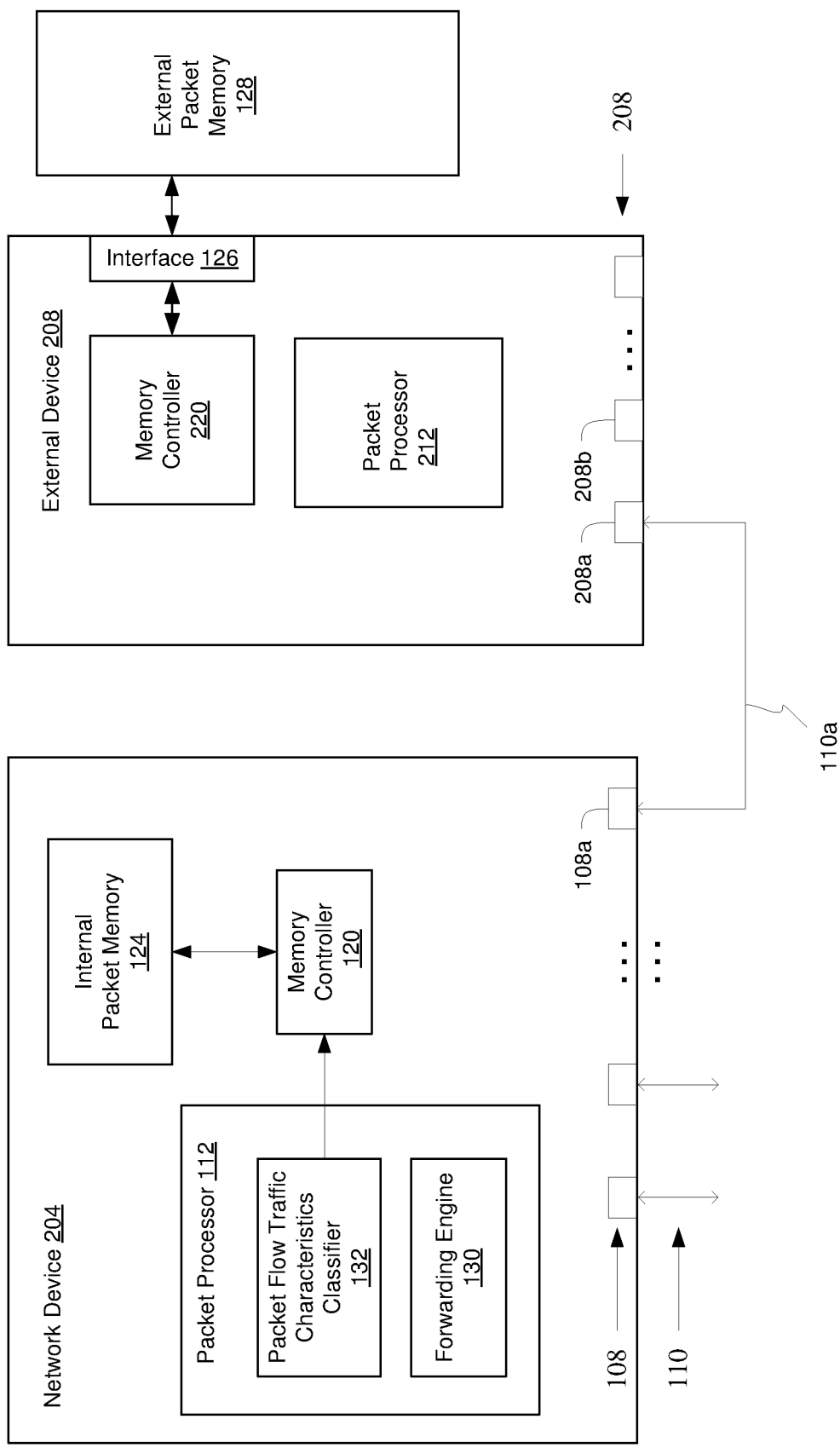
FIG. 2 is a block diagram of another example network device configured to utilize hybrid packet memory architecture for buffering packets that traverse the network device, according to an embodiment.

FIG. 2 is a block diagram of another example network device 204, according to an embodiment. The network device 204 is similar to the network device 204 of FIG. 1, except that the network device 204 is configured to couple to the external packet memory 128 via an external device 208. The external device 208 is a suitable network device, such as a switch, a router, etc., that is coupled to the external packet memory 128, in an embodiment. The external network device 208 is illustrated in FIG. 2 in simplified form as including a packet processor 212 and a memory controller 220. The external network device 208 also includes one or more network ports 208 for coupling to respective one or more network links. The external device 208 additionally or alternatively includes other components, in some embodiments.

The network device 204 includes many of the like-numbered components with the network device 104 of FIG. 1. The network device 204, however, omits the interface 126 to the external packet memory 128, in an embodiment. Instead, the network device 204 is coupled to the external network device 208 that, in turn, is coupled to the external packet memory 128, in an embodiment. In an embodiment, the network device 204 is coupled to the external network device 208 via a network link (e.g., network link 110*a*) between a network port 108 (e.g., network port 108*a*) of the network device 204 and a network port 208 (e.g., network port 208*a*) of the external network device 208, in an embodiment. In an embodiment, the network port 108*a*, the network link 110*a* and the network 208*a* support the access bandwidth of the external packet memory 128. In another embodiment, multiple network ports 108, multiple network port 208 and multiple network links 110 are utilized to collectively support the access bandwidth of the external packet memory 128.

In an embodiment, a packet received by the network device 204 is provided to the packet processor 112. The forwarding engine 130 of the packet processor 112 determines a port 108 via which the packet is to be transmitted. The packet flow traffic characteristics classifier 132 determines a particular packet flow to which the packet belongs, in an embodiment. The packet flow traffic characteristics classifier 132 also determines a traffic packet category of the particular packet flow. For example, the packet flow traffic characteristics classifier 132 determines whether the particular packet flow corresponds to a packet flow of a first traffic pattern category (e.g., a mice packet flow in a datacenter network, a backhaul packet flow in a mobile network, etc.) or a packet flow of a second traffic pattern category (e.g., an elephant packet flow in a datacenter network, a fronthaul packet flow in a mobile network, etc.). The traffic pattern category indicates whether the packet is to be buffered in the internal packet memory 124 or the external packet memory 128, in an embodiment. In another embodiment, the packet flow traffic characteristics classifier 132 directly determines whether the packet is to be buffered in the internal packet memory 124 or the external packet memory 128 based on information indicative of traffic pattern characteristics of the particular packet flow to which the packet belongs.

In an embodiment, if it is determined during processing of a packet that the packet is to be buffered in the external packet memory 128, the packet processor 112 transmits the packet via the port 108*a* to the external network device 208, in an embodiment. In an embodiment, prior to transmitting the packet to the external network device 208, the packet processor 112 adds, to the packet, an indication of the port 108 of the network device 204 via which the packet is to subsequently be transmitted from the network device 204. For example, the packet processor 112 adds a tag, such as a distributed system architecture (DSA) tag or another suitable tag, to a header of the packet, and includes, in the tag, the indication of the of the port 108 of the network device 204 via which the packet is to be subsequently transmitted by the network device 204, in an embodiment.

The external device 208 receives the packet and provides the packet to the packet processor 212. The packet processor 212 minimally processes the packet, for example merely to determine, based on the tag (e.g., DSA tag) in the packet, the port 108 of the network device 204 via which the packet is to subsequently be transmitted. The packet processor 112 provides the packet, and the indication of the port 108 of the network device 204 via which the packet is to subsequently be transmitted, to the memory controller 220, in an embodiment. The memory controller 220 enqueues the packet in the external packet memory 128 in a queue corresponding to the port 108 of the network device 204 via which the packet is to be subsequently transmitted, in an embodiment.

The network device 204 (e.g., the packet processor 112 of the network device 204) is configured to provide flow control messages to the external network device 208, in an embodiment. For example, the network device 204 is configured to transmit flow control messages to the external network device 208 via the port 108*a* coupled to the external network device 208, in an embodiment. A flow control message transmitted by the network device 204 to the external network device 208 is configured to indicate one or more ports 108 of the network device 204 that are available for transmission of a packet (or packets) buffered in the external packet memory 128, in an embodiment. In an embodiment, the network device 208 (e.g., the packet processor 212 of the network device 208) is configured to process a flow control message received from the network device 204 and to determine one or more ports 108 of the network device 108 available for transmission of packets buffered in the external packet memory 128. In response to determining that a particular port 108 of the network device 204 is available for transmission of packets buffered in the external packet memory 128, the network device 208 (e.g., the memory controller 220 of the network device 2080 dequeues one or more packets from the queue, in the external packet memory 128, corresponding to the particular port 108 of the network device 204.

The network device 208 then transmits the one or more packets (e.g., via the port 208*a*) to the network device 204. The network device 204 (e.g., the packet processor 112) forwards the packets to the particular port 108 via which the packets are to be transmitted, in an embodiment. In an embodiment, the packet processor 112 determines the particular port 108 to which to forward a packet received from the network device 208 based on an indication in the tag (e.g., the DSA tag) in the packet. In an embodiment, prior to forwarding the packet to the particular port 108, the packet processor 112 removes the tag from the packet. The network device 204 then transmits the packet from the particular port 108, in an embodiment.

In some embodiments, the external network device 208 is coupled to multiple network devices, and the external packet memory 128 is used to externally buffer packets for the multiple network devices. For example, the port 208*b* of the external network device 208 is coupled to another network device, and the network device 208 is configured, in addition to minimally processing and queuing packets received from the network device 204 in first queues, in the external packet memory 128, corresponding to ports 108 of the network device 204, to minimally process packets queue packets received from the other network device in second queues, in the external packet memory 128, corresponding to ports of the other network device. The network device 204 is also configured to receive flow control messages from the other network device, and to transmit packets queues in the external packet memory 128 to the other network device for transmission of the packets from the other network device, in an embodiment.

Figure 3:
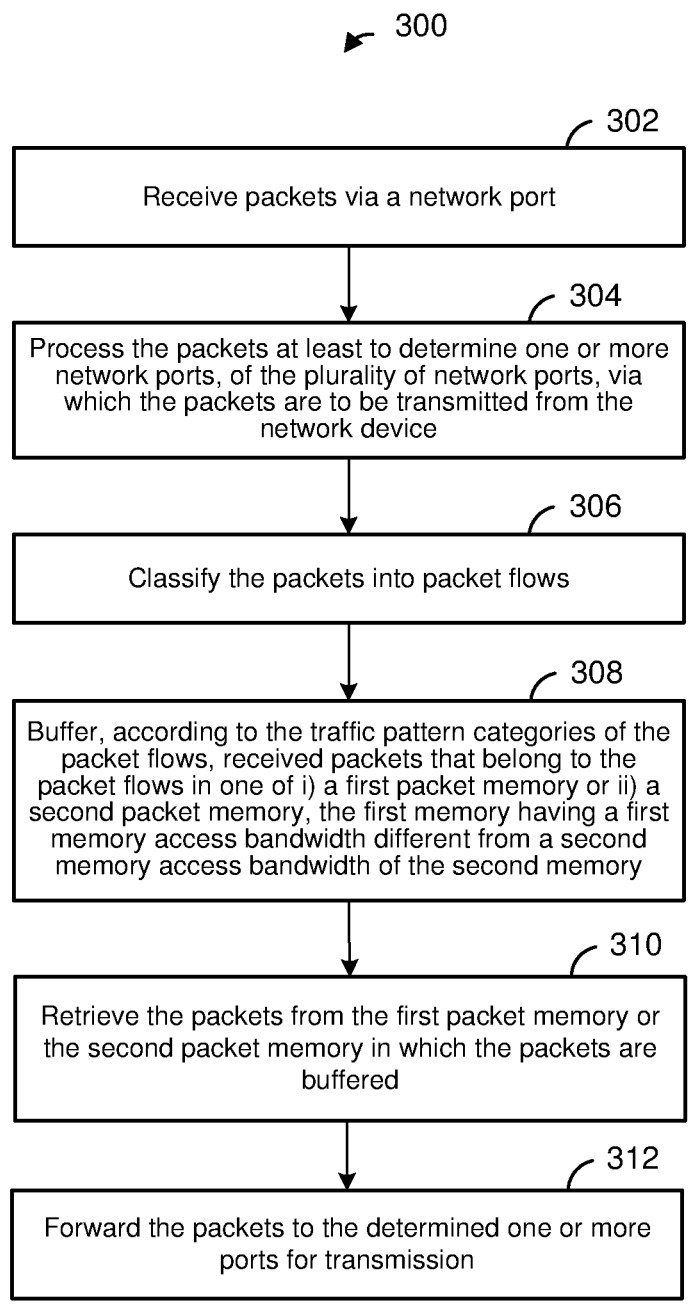
FIG. 3 is a flow diagram of an example method for processing packets in a network device that utilizes a hybrid packet memory architecture, according to another embodiment.

FIG. 3 is a flow diagram illustrating an example method 300 for processing packets in a network device, according to an embodiment. In an embodiment, the network device 104 of FIG. 1 implements the method 300 to process packets. For example, in an embodiment, the packet processor 112 of the network device 104 implements at least a portion of the method 300 to process packets. In another embodiment, the network device 204 of FIG. 2 implements the method 300 to process packets. For ease of explanation, the method 300 is described with reference to the network device 104 of FIGS. 1, 2. In other embodiments, the method 300 is implemented by other suitable network devices.

At a block 302, packets are received by the network device. In an embodiment, the packets are received via a port 108 of the network device 104 of FIG. 1. In another embodiment, the packets are received via a port 108 of the network device 204 of FIG. 2.

At blocks 304 and 306, the packets received at block 302 are at least initially processed at least to determine one or more network ports of the network device via which the packets are to be transmitted (block 304) and to classify the packets into packet flows (block 306). In an embodiment, the forwarding engine 130 of packet processor 112 of the network device 104, 204 determines the one or more network ports via which the packets are to be transmitted, and the packet flow traffic characteristics classifier 132 of packet processor 112 of the network device 104, 204 classifies the packets into packet flows. In another embodiment, a suitable component different from the forwarding engine 130 determines the one or more network ports via which the packets are to be transmitted and/or a suitable component different from the packet flow traffic characteristics classifier 132 classifies the packets into packet flows.

At block 308, the packets are buffered in one of in one of i) a first packet memory and ii) a second packet memory. In an embodiment, the first packet memory corresponds to the first packet memory 124 of FIGS. 1, 2 and the second packer memory corresponds to the second packet memory 128 of FIGS. 1, 2. In another embodiment, the first packet memory is a suitable packet memory different from the first packet memory 124 and/or the second packet memory is a suitable packet memory different from the second packet memory 128. In an embodiment, the first packet memory has a memory access bandwidth that is different from a memory access bandwidth of the second packet memory. For example, the first packet memory has a higher memory access bandwidth than the second packet memory. In an embodiment, the first packet memory has a storage capacity that is different from a storage capacity of the second packet memory. For example, the first packet memory is lower in storage capacity than the second packet memory. In an embodiment, the first packet memory is an internal packet memory that is implemented on a same one or more integrated circuits (e.g., a chip) as a packet processor of the network device. On the other hand, the second packet memory is an external packet memory that is implemented externally to the one or more integrated circuits on which the packet processor of the network device is implemented, in an embodiment. In another embodiment, however, the first packet memory and the second packet memory are both internal packet memories implemented on a same one or more integrated circuits (e.g., a chip) as a packet processor of the network device or are both external packet memories implemented externally to the one or more integrated circuits on which the packet processor of the network device is implemented.

In an embodiment, buffering of packets in one of the first packet memory and the second packet memory at block 308 is performed according to traffic pattern categories of the packet flows to which the packets belong. For example, packets that belong to packet flows of a first traffic pattern category corresponding to relatively larger, higher bandwidth, packet flows (e.g., elephant packet flows in a datacenter network, fronthaul packet flows in a mobile network, etc.) are buffered in the first packet memory while packets that belong to packet flows of a second traffic pattern category corresponding to relatively smaller, lower bandwidth, packet flows (e.g., mice packet flows in a datacenter network, backhaul packet flows in a mobile network, etc.) are buffered in the second packet memory. Offloading buffering of packets that belong to only some packet flows, such as only relatively smaller packet flows, to the second packet memory limits the required access bandwidth of the second packet memory and the memory interface needed for accessing the second packet memory, in at least some embodiments. Moreover, offloading relatively smaller packet flows to the second packet memory provides more memory space for buffering relatively larger packet flows in the first packet memory, in an embodiment.

At block 310, after processing of the packets, packets are retrieved from the first packet memory or the second packet memory in which the packets are stored. In an embodiment, retrieving a packet at block 412 includes determining whether the packet is stored in the first packet memory or the second packet memory. For example, it is determined whether the packet is stored in the first packet memory or the second packet memory based on a flow ID assigned to the packet. In other embodiments, it is determined determining whether the packet is stored in the internal packet memory or the external packet memory in other suitable manners.

At block 312, the packet retrieved at block 310 are forwarded to a network port of the one or more network ports determined for transmission of the packet, and the packet is subsequently transmitted from the network device via the network port.

In an embodiment, a method for processing packets in a network device includes: receiving, at a packet processor of the network device, packets ingressing via a network port among a plurality of network ports of the network device; processing, with the packet processor, the packets at least to determine one or more network ports, of the plurality of network ports, via which the packets are to be transmitted from the network device; classifying, with the packet processor, the packets into packet flows, the packet flows being further categorized into traffic pattern categories characteristic of traffic pattern characteristics of the packet flows; buffering, with the packet processor, according to the traffic pattern categories of the packet flows, packets that belong to the packet flows in one of i) a first packet memory and ii) a second packet memory, the first packet memory having a first memory access bandwidth different from a second memory access bandwidth of the second packet memory; after processing the packets, retrieving, with the packet processor, the packets from the first packet memory or the second packet memory in which the packets are buffered; and forwarding, with the packet processor, the packets to the determined one or more network ports for transmission of the packets via the determined one or more network ports.

In other embodiments, the method includes any suitable combination of one or more of the following features.

Buffering the packets includes selecting the first packet memory or the second packet memory for buffering packets that belong to a particular packet flow based on information indicative of one or both of i) a total volume of data expected to be received in the particular packet flow and ii) a rate of reception of data in the particular packet flow.

Buffering the packets includes selecting the first packet memory or the second packet memory for buffering packets that belong to a particular packet flow based on information indicative of one or both of i) type of data carried in the packets that belong to the particular packet flow and ii) priority of data carried in the packets that belong to the particular packet flow.

Buffering the packets includes selecting the first packet memory or the second packet memory for buffering packets that belong to a particular packet flow based on information indicative of one or both i) a source of the particular packet flow and ii) a destination of the particular packet flow.

The first access bandwidth of the first packet memory is higher than the second access bandwidth of the second packet memory, and buffering the packets comprises buffering packets that belong to packet flows in a first traffic pattern category in the first packet memory and buffering packets that belong to packet flows in a second traffic pattern category in the second packet memory, wherein respective packet flows in the first traffic pattern category are larger in total expected volume of data as compared to respective packet flows that belong to the second pattern traffic category.

The first packet memory has a first storage capacity that is larger than a second storage capacity of the second packet memory, and buffering the packets comprises buffering packets that belong to packet flows in a first traffic pattern category in the first packet memory and buffering packets that belong to packet flows in a second traffic pattern category in the second packet memory, wherein respective packet flows in the first traffic pattern category are smaller in total expected volume of data as compared to respective packet flows that belong to the second pattern traffic category.

The first packet memory is internal to one or more integrated circuits on which the packet processor is implemented, the second packet memory is external to the one or more integrated circuits on which the packet processor is implemented, and buffering the packets comprises buffering packets that belong to packet flows in a first traffic pattern category in the first packet memory and buffering packets that belong to packet flows in a second traffic pattern category in the second packet memory, wherein respective packet flows in the first traffic pattern category are larger in total expected volume of data as compared to respective packet flows that belong to the second pattern traffic category.

The second packet memory is associated with an external network device coupled to the network device via a network port of the plurality of network ports.

Buffering the packets includes, when it is determined that a packet is to be buffered in the second packet memory, adding a tag to the packet, the tag indicating at least the network port of the network device via which the packet is to be transmitted, and transmitting the packet to the external network device for buffering of the packet in the second packet memory associated with the external network device.

The method further comprises transmitting, with the packet processor, a flow control message to the external network device, the flow control message indicating to the external device that a particular port among the plurality of ports is available for transmission of packets stored in the second packet memory.

In another embodiment, a network device comprises a plurality of network ports configured to couple to a plurality of network links and a packet processor coupled to the plurality of network ports. The packet processor is configured to: process packets received via a network port among the plurality of network ports at least to determine one or more other network ports among the plurality of network ports via which the packets are to be transmitted from the network device; classify the packets into packet flows, the packet flows being further categorized into traffic pattern categories characteristic of traffic pattern characteristics of the packet flows; buffer, according to the traffic pattern categories of the packet flows, packets that belong to the packet flows in one of i) a first packet memory an ii) a second packet memory, the first packet memory having a first memory access bandwidth different from a second memory access bandwidth of the second packet memory; after processing the packets, retrieve the packets from the first packet memory or the second packet memory in which the packets are buffered; and forward the packets to the determined one or more network ports for transmission of the packets via the determined one or more network ports.

In other embodiments, the network device comprises any suitable combination of one or more of the following features.

The packet processor is further configured to select the first packet memory or the second packet memory for buffering packets that belong to a particular packet flow based on information indicative of one or both of i) a total volume of data expected to be received in the particular packet flow and ii) a rate of reception of data in the particular packet flow.

The packet processor is further configured to select the first packet memory or the second packet memory for buffering packets that belong to a particular packet flow based on information indicative of one or both of i) type of data carried in the packets that belong to the particular packet flow and ii) priority of data carried in the packets that belong to the particular packet flow.

The packet processor is further configured to select the first packet memory or the second packet memory for buffering packets that belong to a particular packet flow based on information indicative of one or both i) a source of the particular packet flow and ii) a destination of the particular packet flow.

The first access bandwidth of the first packet memory is higher than the second access bandwidth of the second packet memory.

The packet processor is configured to buffer packets that belong to packet flows in a first traffic pattern category in the first packet memory and buffering packets that belong to packet flows in a second traffic pattern category in the second packet memory, wherein respective packet flows in the first traffic pattern category are larger in total expected volume of data as compared to respective packet flows that belong to the second pattern traffic category.

The first packet memory has a first storage capacity that is larger than a second storage capacity of the second packet memory.

The packet processor is configured to buffer packets that belong to packet flows in a first traffic pattern category in the first packet memory and buffering packets that belong to packet flows in a second traffic pattern category in the second packet memory, wherein respective packet flows in the first traffic pattern category are smaller in total expected volume of data as compared to respective packet flows that belong to the second pattern traffic category.

The packet processor is implemented on one or more integrated circuits, the first packet memory is internal to the one or more integrated circuits on which the packet processor is implemented, and the second packet memory is external to the one or more integrated circuits on which the packet processor is implemented.

The second packet memory is associated with an external network device coupled to the network device via a network port of the plurality of network ports.

The packet processor is configured to, when it is determined that a packet is to be buffered in the second packet memory, add a tag to the packet, the tag indicating at least the network port of the network device via which the packet is to be transmitted, and transmit the packet to the external network device for buffering of the packet in the second packet memory associated with the external network device.

The packet processor is further configured to a flow control message to the external network device, the flow control message indicating to the external device that a particular port among the plurality of ports is available for transmission of packets stored in the second packet memory At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing packets in a network device, the method comprising:
   receiving, at a packet processor of the network device, packets ingressing via a network port among a plurality of network ports of the network device;

processing, with the packet processor, the packets at least to determine one or more network ports, of the plurality of network ports, via which the packets are to be transmitted from the network device;

classifying, with the packet processor according at least in part to source address information and destination address information obtained from headers of the packets, the packets into packet flows, the packet flows being further categorized into traffic pattern categories characteristic of at least a time duration of the packet flows, wherein the time duration of a particular packet flow corresponds to a duration of time from a beginning of the particular packet flow until completion of the particular packet flow;

buffering, with the packet processor, according to the traffic pattern categories characteristic of at least the time duration of the packet flows, packets that belong to the packet flows in a selected one of i) a first packet memory having a first memory access bandwidth and ii) a second packet memory having a second memory access bandwidth that is lower than the first memory access bandwidth, including i) selecting the first packet memory for buffering packets that belong to packet flows in a first traffic pattern category and ii) selecting the second packet memory for buffering packets that belong to packet flows in a second traffic pattern category, wherein respective packet flows in the first traffic pattern category are longer in time duration as compared to respective packet flows in the second pattern traffic category;

after processing the packets, retrieving, with the packet processor, the packets from the first packet memory or the second packet memory in which the packets are buffered according to traffic pattern categories characteristic of at least the time duration of the packet flows; and forwarding, with the packet processor, the packets to the determined one or more network ports for transmission of the packets via the determined one or more network ports.

2. The method of claim 1, wherein buffering the packets includes selecting the first packet memory or the second packet memory for buffering packets that belong to a particular packet flow based on information indicative of one or both of i) a total volume of data expected to be received in the particular packet flow and ii) a rate of reception of data in the particular packet flow.

3. The method of claim 1, wherein buffering the packets includes selecting the first packet memory or the second packet memory for buffering packets that belong to a particular packet flow based on information indicative of one or both of i) type of data carried in the packets that belong to the particular packet flow and ii) priority of data carried in the packets that belong to the particular packet flow.

4. The method of claim 1, wherein buffering the packets includes selecting the first packet memory or the second packet memory for buffering packets that belong to a particular packet flow based on information indicative of one or both i) a source of the particular packet flow and ii) a destination of the particular packet flow.

5. The method of claim 1, wherein
respective packet flows in the first traffic pattern category are larger in total expected volume of data as compared to respective packet flows in the second pattern traffic category.

6. The method of claim 1, wherein
the first packet memory has a first storage capacity that is larger than a second storage capacity of the second packet memory, and
wherein respective packet flows in the first traffic pattern category are smaller in total expected volume of data as compared to respective packet flows in the second pattern traffic category.

7. The method of claim 1, wherein
the first packet memory is internal to one or more integrated circuits on which the packet processor is implemented,
the second packet memory is external to the one or more integrated circuits on which the packet processor is implemented, and
wherein respective packet flows in the first traffic pattern category are larger in total expected volume of data as compared to respective packet flows in the second pattern traffic category.

8. The method of claim 1, wherein
the second packet memory is associated with an external network device coupled to the network device via a network port of the plurality of network ports, and
buffering the packets includes, when it is determined that a packet is to be buffered in the second packet memory, adding a tag to the packet, the tag indicating at least the network port of the network device via which the packet is to be transmitted, and
transmitting the packet to the external network device for buffering of the packet in the second packet memory associated with the external network device.

9. The method of claim 8, further comprising, transmitting, with the packet processor, a flow control message to the external network device, the flow control message indicating to the external device that a particular port among the plurality of ports is available for transmission of packets stored in the second packet memory.

10. A network device, comprising:
a plurality of network ports configured to couple to a plurality of network links; and
a packet processor coupled to the plurality of network ports, the packet processor configured to:
process packets received via a network port among the plurality of network ports at least to determine one or more other network ports among the plurality of network ports via which the packets are to be transmitted from the network device;
classify, according at least in part to source address information and destination address information obtained from headers of the packets, the packets into packet flows, the packet flows being further categorized into traffic pattern categories characteristic of at least a time duration of the packet flows, wherein the time duration of a particular packet flow corresponds to a duration of time from a beginning of the particular packet flow until completion of the particular packet flow;
buffer, according to the traffic pattern categories characteristic of at least the time duration of the packet flows, packets that belong to the packet flows in a selected one of i) a first packet memory having a first memory access bandwidth and ii) a second packet memory a second memory access bandwidth that is lower than the first memory access bandwidth, wherein i) the first packet memory is selected for buffering packets that belong to packet flows in a first traffic pattern category and ii) the second packet memory is selected for buffering packets that belong to packet flows in a second traffic pattern category, wherein respective packet flows in the first traffic pattern category are longer in time duration as compared to respective packet flows in the second pattern traffic category;

after processing the packets, retrieve the packets from the first packet memory or the second packet memory in which the packets are buffered according to traffic pattern categories characteristic of at least the time duration of the packet flows; and forward the packets to the determined one or more network ports for transmission of the packets via the determined one or more network ports.

11. The network device of claim 10, wherein the packet processor is further configured to select the first packet memory or the second packet memory for buffering packets that belong to a particular packet flow based on information indicative of one or both of i) a total volume of data expected to be received in the particular packet flow and ii) a rate of reception of data in the particular packet flow.

12. The network device of claim 10, wherein the packet processor is further configured to select the first packet memory or the second packet memory for buffering packets that belong to a particular packet flow based on information indicative of one or both of i) type of data carried in the packets that belong to the particular packet flow and ii) priority of data carried in the packets that belong to the particular packet flow.

13. The network device of claim 10, wherein the packet processor is further configured to select the first packet memory or the second packet memory for buffering packets that belong to a particular packet flow based on information indicative of one or both i) a source of the particular packet flow and ii) a destination of the particular packet flow.

14. The network device of claim 10, wherein respective packet flows in the first traffic pattern category are larger in total expected volume of data as compared to respective packet flows in the second pattern traffic category.

15. The network device of claim 10, wherein the first packet memory has a first storage capacity that is smaller than a second storage capacity of the second packet memory.

16. The network device of claim 10, wherein
the packet processor is implemented on one or more integrated circuits,
the first packet memory is internal to the one or more integrated circuits on which the packet processor is implemented,
the second packet memory is external to the one or more integrated circuits on which the packet processor is implemented.

17. The network device of claim 10, wherein
the second packet memory is associated with an external network device coupled to the network device via a network port of the plurality of network ports, and
the packet processor is configured to, when it is determined that a packet is to be buffered in the second packet memory,
add a tag to the packet, the tag indicating at least the network port of the network device via which the packet is to be transmitted, and
transmit the packet to the external network device for buffering of the packet in the second packet memory associated with the external network device.

18. The network device of claim 17, wherein the packet processor is further configured to transmit a flow control message to the external network device, the flow control message indicating to the external device that a particular port among the plurality of ports is available for transmission of packets stored in the second packet memory.

19. The method of claim 1, wherein respective packet flows in the first traffic pattern category take relatively longer times to complete as compared to respective packet flows in the second pattern traffic category.

20. The network device of claim 10, wherein respective packet flows in the first traffic pattern category take relatively longer times to complete as compared to respective packet flows in the second pattern traffic category.

* * * * *